Sept. 26, 1939.　　　E. ORSHANSKY, JR　　　2,173,856
TRANSMISSION
Filed June 6, 1935　　　9 Sheets-Sheet 1
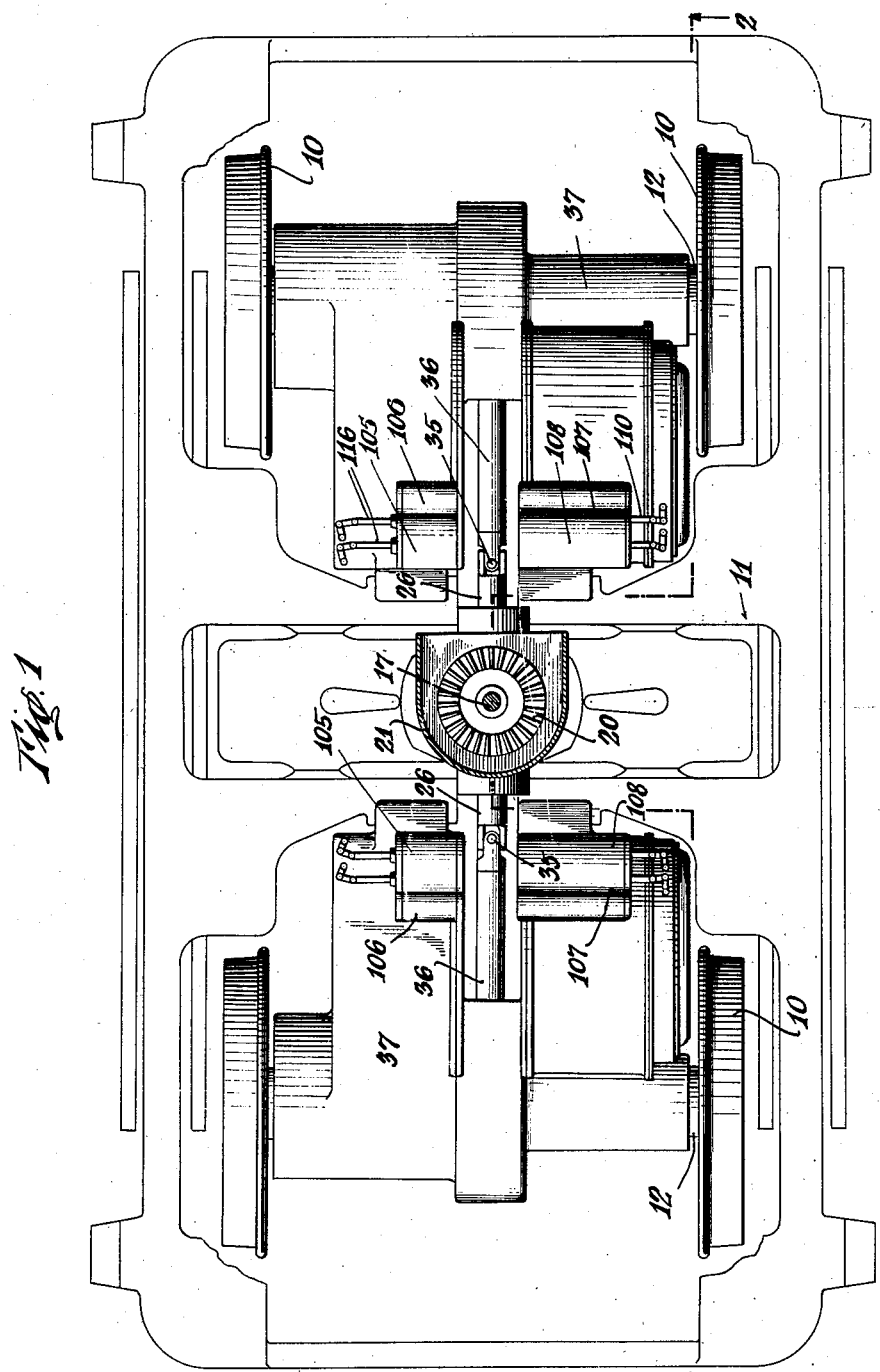
Fig.1
INVENTOR
Elias Orshansky, Jr.
BY
ATTORNEYS

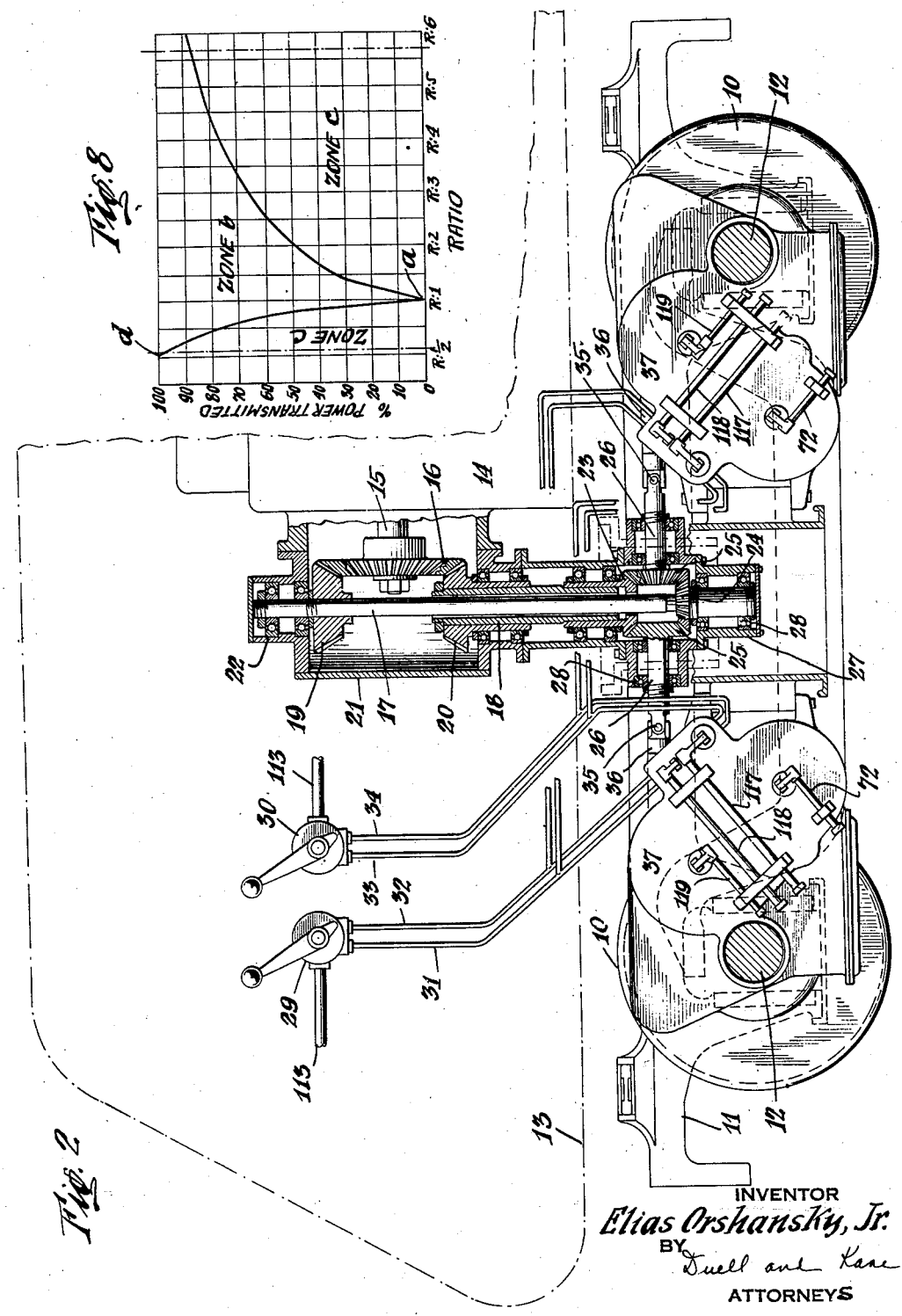

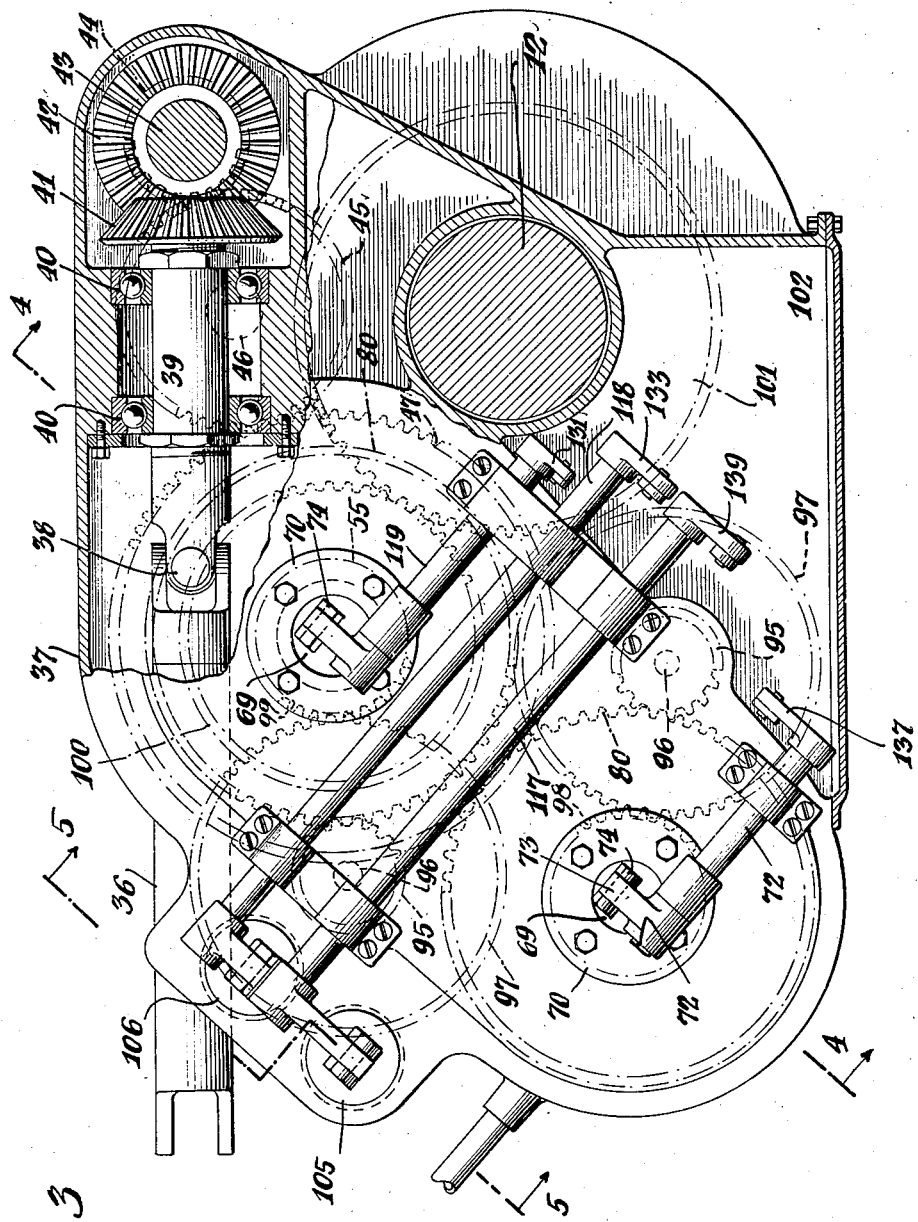

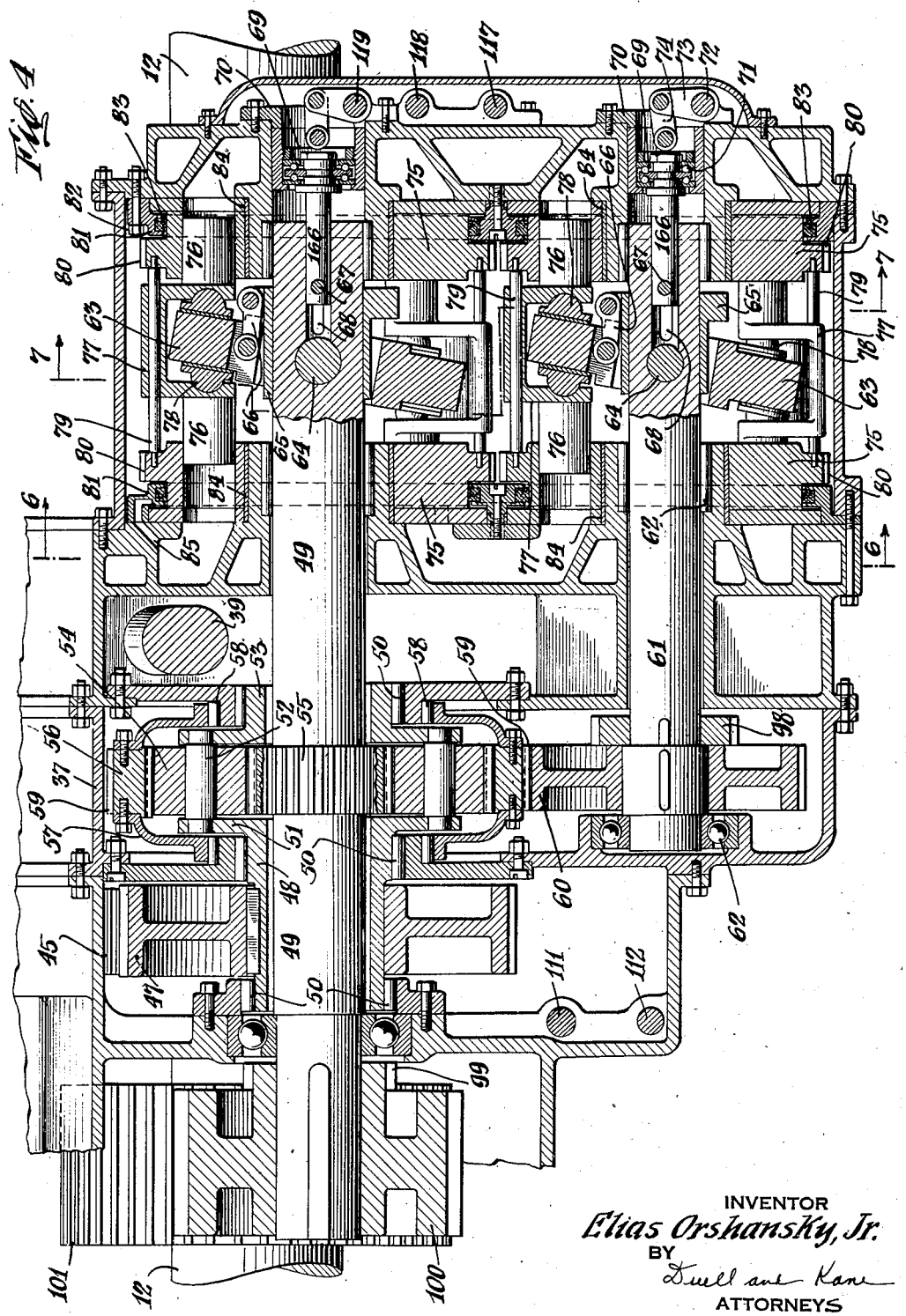

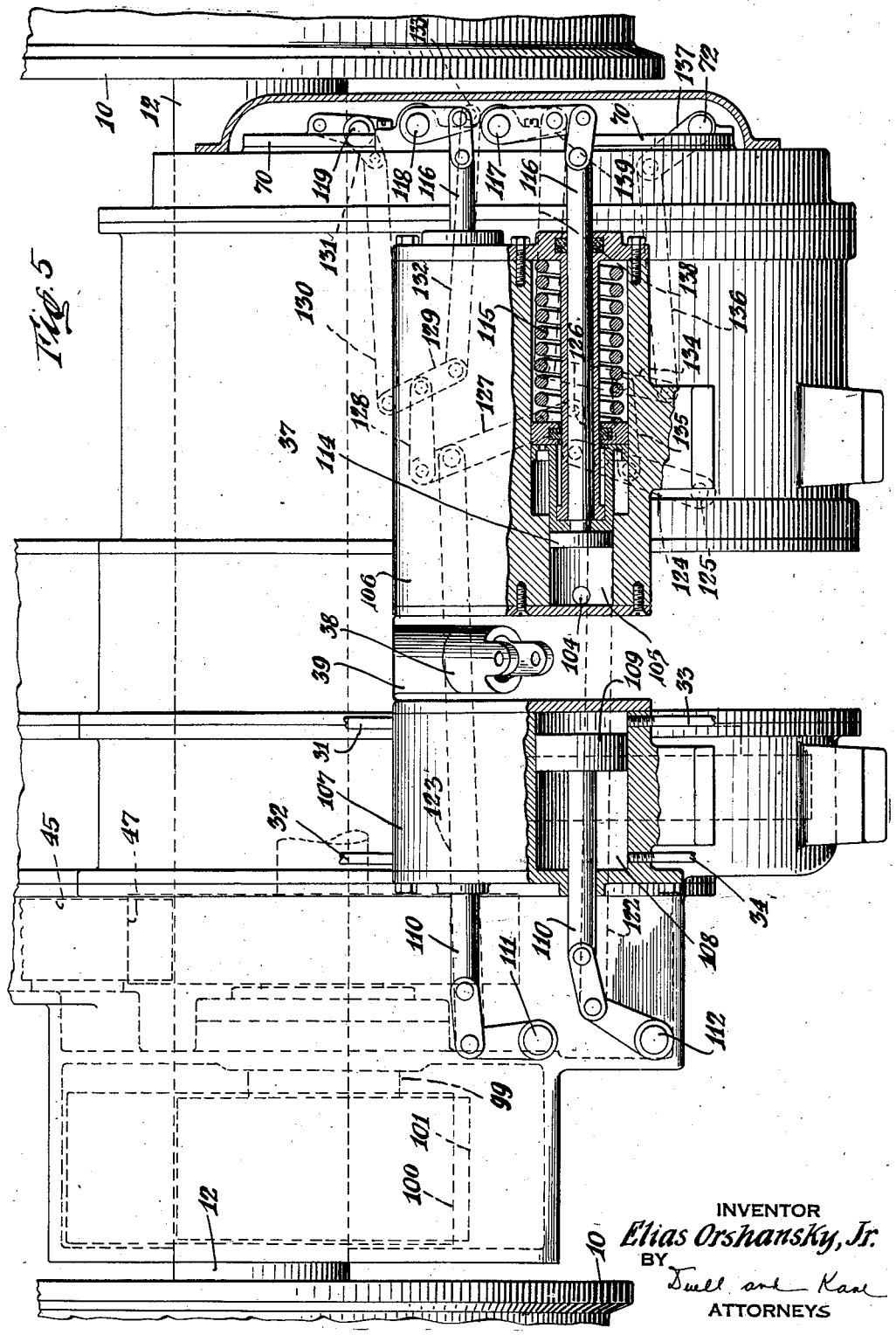

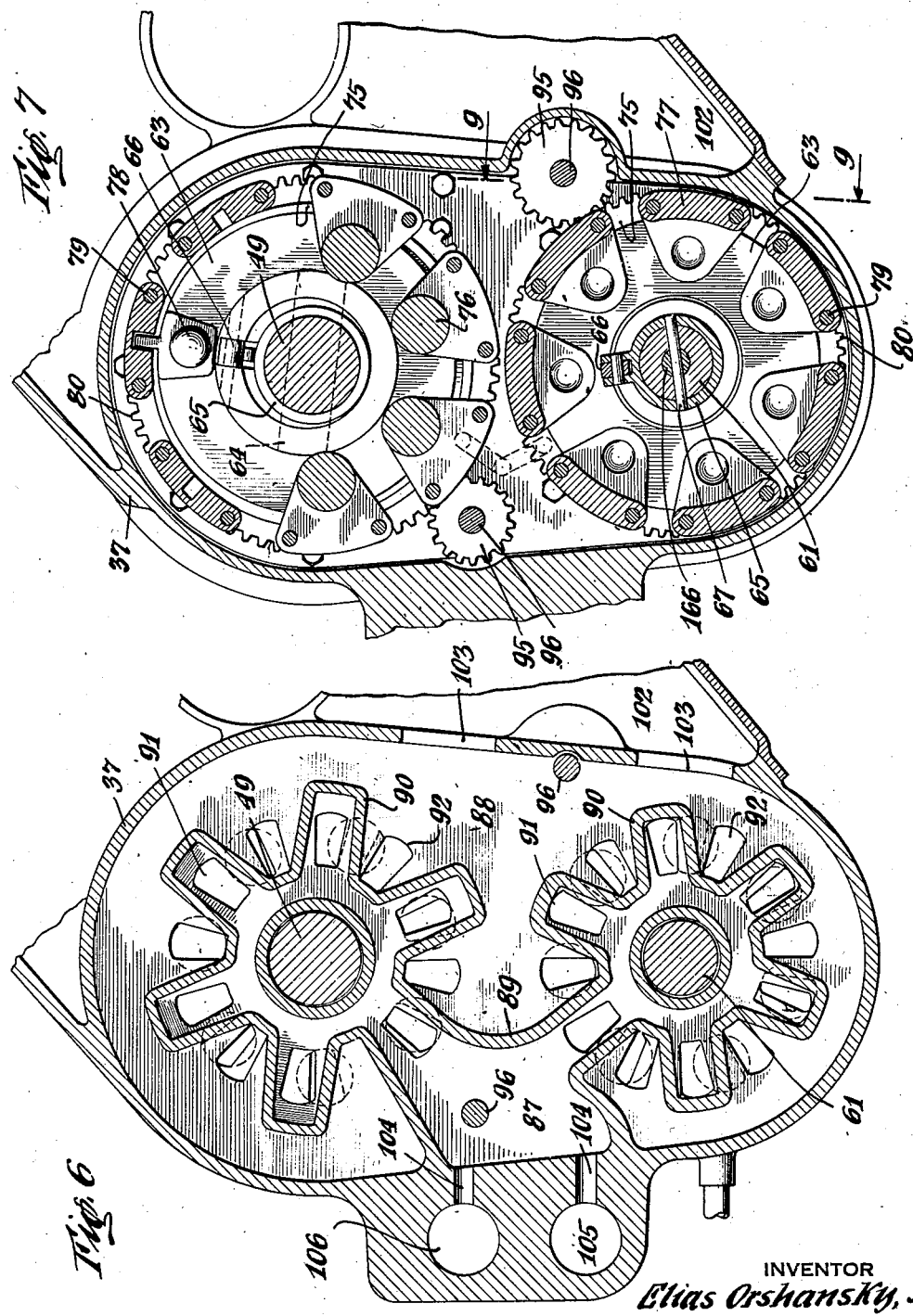

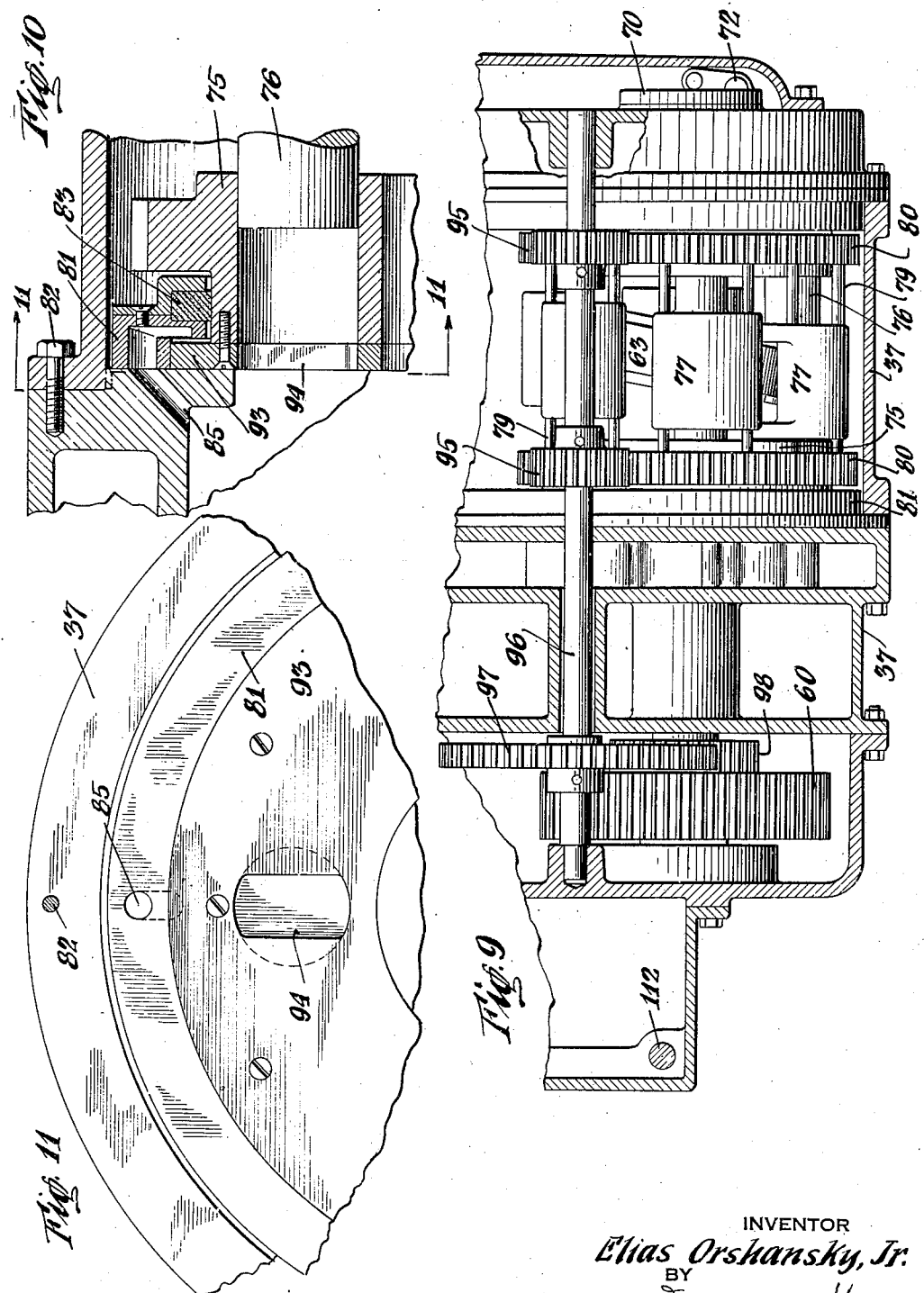

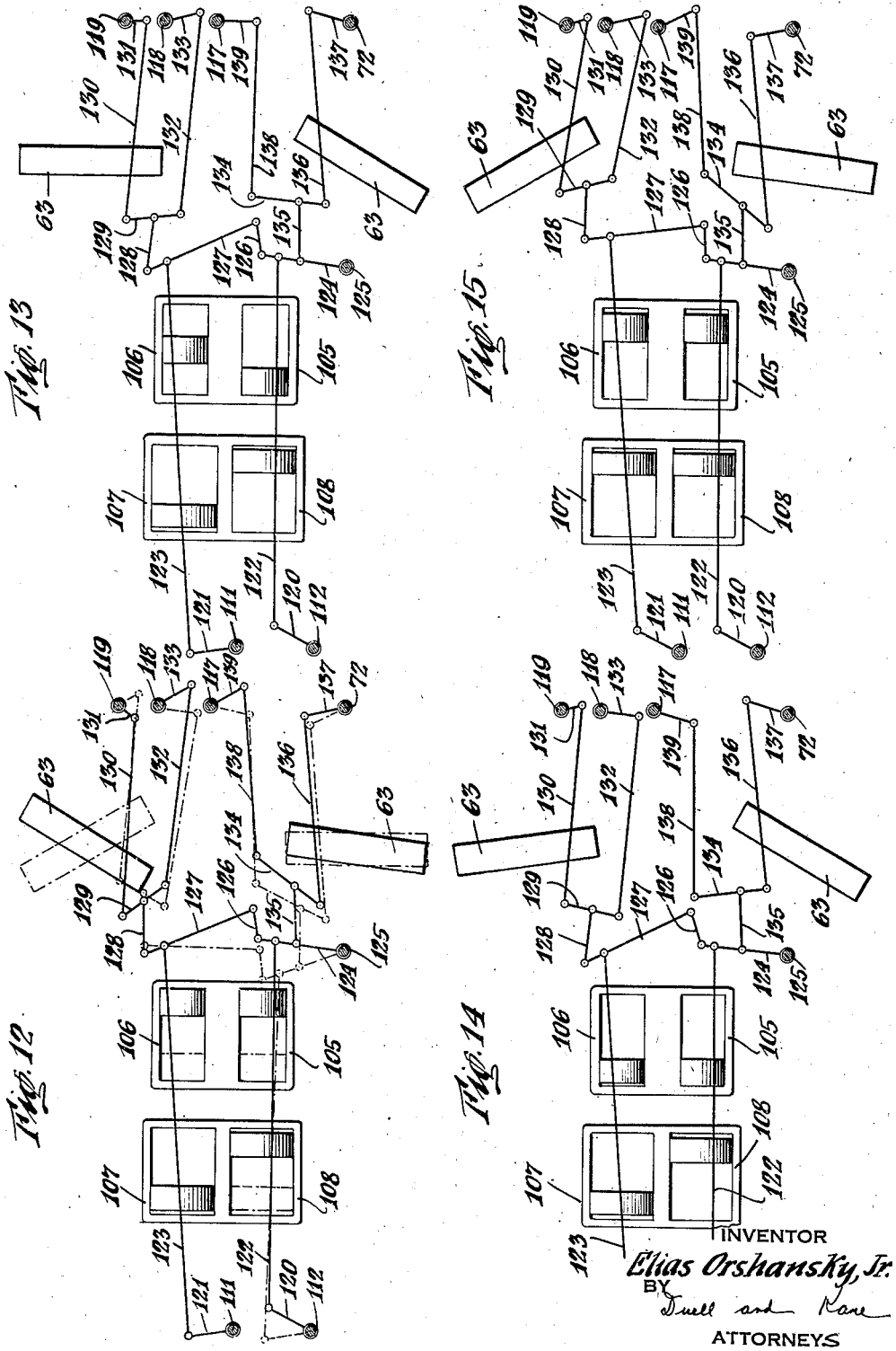

Sept. 26, 1939.   E. ORSHANSKY, JR   2,173,856
TRANSMISSION
Filed June 6, 1935   9 Sheets-Sheet 9
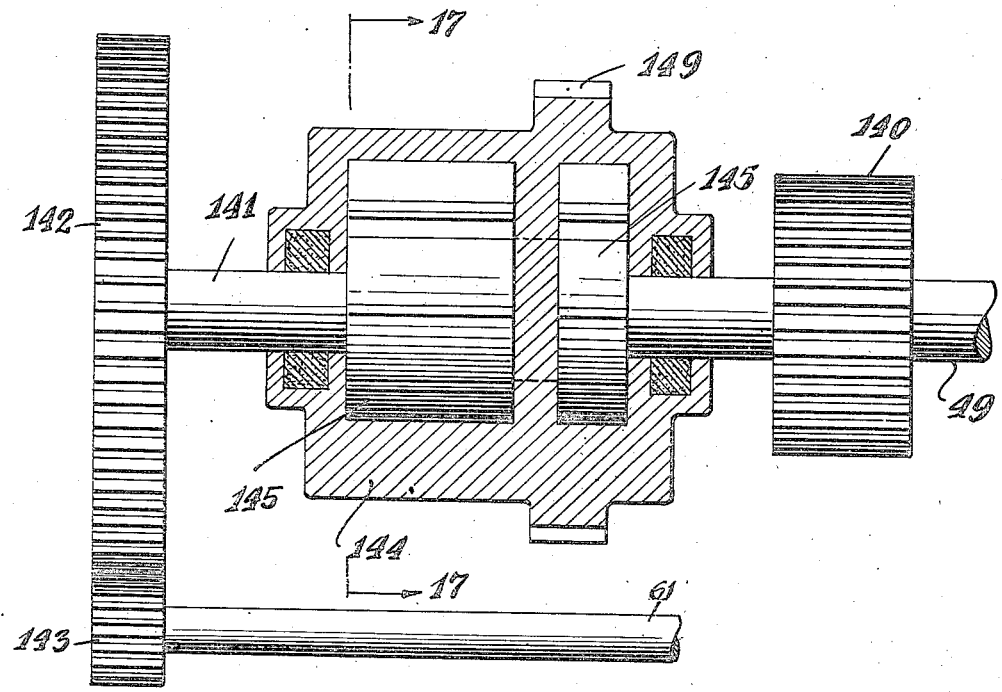
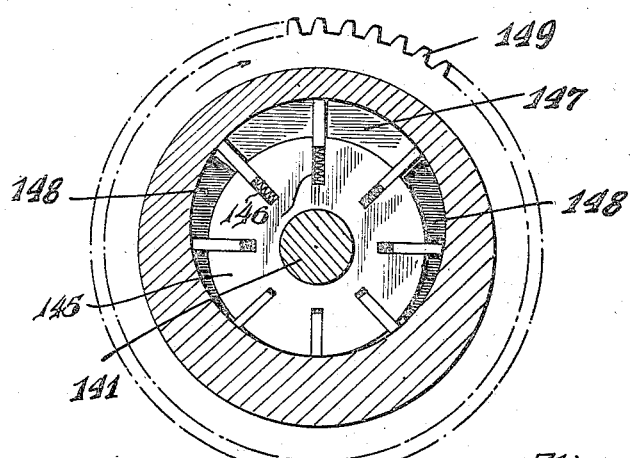
INVENTOR
Elias Orshansky, Jr.
BY
ATTORNEYS Patented Sept. 26, 1939

2,173,856

UNITED STATES PATENT OFFICE 2,173,856

TRANSMISSION

Elias Orshansky, Jr., New York, N. Y., assignor to The Acrotorque Company, New Haven, Conn., a corporation of Connecticut Application June 6, 1935, Serial No. 25,201

15 Claims. (Cl. 74—189.5)

This invention relates to a structurally and functionally improved transmission capable of use in numerous different associations, but primarily intended to be employed in transmitting a power drive from a driving member, such as an internal combustion motor, to a driven member such as the axle or axles of a vehicle.

It is an object of the invention to furnish a transmission capable of use in connection with hoisting machinery, rail vehicles, road vehicles, and in numerous other associations and by means of which the conventional gear shift heretofore employed may be dispensed with.

A further object of the invention is that of providing a transmission capable of being associated with a prime mover of relatively high power and which transmission in such association will provide for a variable range of speed on the part of the driven member. In other words, great difficulty has been heretofore experienced in providing what is commonly known as a "gear shift" for use in association with motors developing in excess of a certain power. The present invention provides a transmission which may be employed in connection with such motors.

Thus, it becomes feasible, as for example in the case of Diesel locomotives, to dispense with the electric generator-motor drive, and to substitute in lieu thereof a transmission embodying the teachings of the present invention; such substitution effecting a material saving not alone in weight and the initial installation of the apparatus, but also in the continued maintenance thereof.

A still further object of the invention resides in providing a transmission which will be automatic in operation, and which, under all circumstances, will be capable of developing a variable torque.

Another object is that of providing a mechanical transmission which, as afore brought out, may be used in numerous different associations, but which, according to the teachings of the present invention, will be associated in a most desirable and novel manner with the running gear or power axles of a vehicle, and which transmission may, moreover, be readily controlled by the engineer or operator of the vehicle.

Still another object is that of providing a transmission embodying relatively few parts, each individually simple and rugged in construction, and which parts may be assembled at comparatively small cost to furnish a unitary apparatus operating over long periods of time with freedom from all difficulties.

With these and other objects in mind, reference is had to the attached sheets of drawings illustrating one practical embodiment of the invention, and in which:

Fig. 1 is a plan view of a truck such as may form a part of the running gear of a locomotive of the internal combustion type and showing in association therewith transmissions constructed in accordance with the present invention;

Fig. 2 is a longitudinal sectional view taken along the lines 2—2 and in the direction of the arrows as indicated in Fig. 1;

Fig. 3 is an enlarged end elevation with certain parts broken away to disclose underlying mechanisms;

Fig. 4 is a sectional side view of a transmission unit and taken along the lines 4—4 and in the direction of the arrows as indicated in Fig. 3;

Fig. 5 is a partly sectional side view taken along the lines 5—5 and in the direction of the arrows as indicated in Fig. 3;

Figs. 6 and 7 are transverse sectional views taken along the lines 6—6 and 7—7, respectively, and in the direction of the arrows as indicated in Fig. 4;

Fig. 8 is a graph showing the manner in which the effective power of the transmission is divided under different conditions of operation thereof;

Fig. 9 is a fragmentary section taken along lines 9—9 of Fig. 7;

Fig. 10 is an enlarged fragmentary section showing a detail of the cylinder block;

Fig. 11 is a section taken along lines 11—11 as indicated in Fig. 10;

Figs. 12 to 15, inclusive, show diagrammatically the position of the various controls during the several operating stages of the apparatus;

Fig. 16 shows an alternative form of differential mechanism; and

Fig. 17 is a transverse sectional view taken along the lines 17—17 and in the direction of the arrows as indicated in Fig. 16.

As afore brought out, the present invention is ideally suited for use in connection with so-called "Diesel" and similar types of locomotives. In fact, one feature of the present invention is that of teaching the proper application of a transmission to a vehicle of this type. However, as afore brought out, according to another aspect of the invention the transmission may be employed in numerous different associations without departing from the teachings of the present invention. Accordingly, the present drawings and specification are to be taken in an illustrative rather than in a limiting sense, except where the claims indicate that the contrary is the case.

Thus, referring primarily to Figs. 1 and 2, it will be observed that flanged wheels are indicated at 10 and which are rotatably associated with a conventionally mounted truck generally indicated at 11.

Supported within the body of the vehicle is a prime mover 14 such as a turbine or internal combustion motor, and extending from this motor is a driving shaft 15 to which is coupled a bevel gear 16. A shaft 17 may be disposed at right angles to the shaft 15 and have a tube 18 concentrically disposed with reference to a portion of its body. Bevel gears 19 and 20 are secured to the shaft 17 and sleeve 18, respectively, and mesh with the teeth of gear 16. A housing 21 encloses this assembly of the parts and mounts the same by means of anti-friction bearings 22, this housing extending to the floor of the vehicle body 13 and through the same to a position preferably midway between the axles 12. Secured to the lower end of the sleeve 18 is a bevel gar 23 and a similar gear 24 is secured to the shaft 17. These gears mesh with the teeth of gears 25 secured one to the inner ends of each of the shafts 26, which latter form part of two different transmissions cooperating with the respective axles of the truck. As shown, the last described parts are all enclosed in a housing 27, which may form a continuation of housing 21, and which, in common with the former housing, may mount anti-friction bearings 28 for the rotatable support of the several shafts and elements disposed within it.

As a consequence of the structure described, it will be understood that with the prime mover 14 operating, the shaft 15 will drive the shaft 17 and sleeve 18, which will, in turn, result in shafts 26 being rotated. In the illustrated embodiment two transmissions have been shown, one in association with each axle. Needless to say, a greater number of transmissions might be employed or a single transmission might serve to drive any number of axles. In the interest of not occupying too much space or having to employ too high pressures, it is preferred to associate a transmission with each axle; it being obvious that if this is not done, larger transmissions operating (as hereinafter explained) at relatively high pressure would be necessary. Additionally, as a consequence of employing two drive members, i. e., the shaft 17 and sleeve 18, the torque is neutralized and, moreover, it is feasible to employ at the lower end of these driving members a double gear drive for both of the shafts 26. In other words, each of the bevel gears 25 or its equivalent is engaged by both gears 23 and 24. If this were not the case, the entire strain of driving would fall upon the zone of contact between, for example, gear 24 and gear 25. Under these circumstances it would be preferable to employ larger gears at this point, and this again is objectionable, if for no other reason than due to the fact that the available space is relatively constricted.

In Fig. 2 there has been indicated controls 29 and 30 which are located at a space accessible to the engineer. Both of these controls may take the form of readily operable levers or handles connected to valves (not shown) which govern the flow of fluid through tubes 31, 32, 33 and 34. The control 29, when operated, throws the mechanism of the transmissions to a condition at which, when power is applied, the axles 12 will be driven clockwise or counter-clockwise; in other words, ahead or reverse. Control 30, when thrown to its extreme positions, causes the mechanism to assume a neutral or driving condition. Consequently, the control 29 may be actuated to cause the drive to be effected in the desired manner, and control 30, when thrown from its neutral to drive condition, assures the desired coaction of the parts. The manner in which this occurs will hereinafter appear more particularly, but it is primarily desirable to next consider the operation of the transmission itself.

With this in mind, attention is next directed to Figs. 3 and 4. In these views it will be observed that but a single transmission has been illustrated, in that each of the transmissions is preferably a substantial duplicate of the other. The shaft 26 has at its outer end a universal 35 of any suitable type, the position of such universal having been indicated in Fig. 2. The driven element of each of these universals forms a part of or is coupled to shaft 36 of each transmission, and which shaft extends into the transmission casing 37 and has at its inner end a further universal 38 coupling it with a shaft 39, which latter is supported upon anti-friction bearings 40 associated with the casing 37. It is found that some degree of vertical movement occurs under conventional forms of construction between the body of the vehicle and the truck, and it is with this in mind that the universals 35 and 38 are provided. Following the design herewith suggested, this movement does not materially exceed substantially five degrees, and it will therefore be understood that no real power loss will occur. As shown in Fig. 3, the shaft 39 rotates a bevel gear 41, the teeth of which mesh with a gear 42 mounted upon a shaft 43. The latter has secured to it a gear 44, the teeth of which, in turn, engage the teeth of a gear 45 mounted upon a counter-shaft 46. This gear in turn meshes with the teeth of a gear 47 which is splined or keyed to a hub 48 encircling a shaft 49 and spaced therefrom. The hub 48 may rotate freely by being mounted, for example, by anti-friction bearings 50 interposed between it and fixed portions of the housing 37. The hub 48 is continued in the form of a disk 51 mounting one end of shafts 52, the opposite ends of which are mounted by a hub-disk 53 integral or otherwise fixed with respect to the disk 51. The disks are also supported by bearings 50, and planetary gears 54 are associated one with each of the shafts 52. These gears encircle a sun gear 55 which may be integral with or otherwise fixedly secured with respect to the shaft 49. The gears 54 are in turn encircled by a ring gear 56, which latter is supported in position as, for example, by securing to the opposite side faces thereof guides or encasing members 57, which guides ride upon anti-friction bearings 58 also in association with fixed portions of the casing 37.

The ring gear 56 has secured to its periphery or is formed with a series of teeth 59 which mesh with the teeth of a gear 60 secured by splining or keying to a shaft 61. The latter is rotatably supported by anti-friction bearings 62, and it is thus obvious that, if the shaft 49 is held against rotation and the gear 45 is rotated, the gear 47 will rotate, and in such rotation turn the hub members 48 and 53, carrying with them the gears 54 around the gear or gear portion 55. This will result in the gear 56 being rotated at an accelerated rate and in the same direction, thus causing a driving of the gear 60 and rotation of the shaft 61.

Associated with each of the shafts 49 and 61 are similar structures, each of which, under certain conditions, act as motors, and under other conditions act as pumps. It will be observed that each of these units includes a wobble plate 63 pivotally secured as at 64 to its respective shaft. Encircling each of these shafts and extending between the same and the inner edge of the wobble plates are collar members 65. Connection between these members and the plates 63 is provided by links 66 which have their ends pivotally connected to these elements. In each of these structures the collar member 65 may be reciprocated along the shafts mounting the same to increase, decrease, neutralize, or (in the case of the upper unit) reverse the angularity of the plates with respect to the shafts. Such reciprocation may, for example, be achieved by boring each of the shafts 49 and 61 and extending into such bores rods 166. Pins 67 are associated with each of these rods and ride through slots 68 formed in the shafts, these pins being connected at their ends to the collar members 65. The outer ends of the rods 166 are in each instance coupled to cup members 69 in the nature of pistons and which cup members have their outward movements limited by stops 70. The connections which exist between the rods and these piston like elements is preferably in the nature of a thrust bearing 71, so that as the rods 166 rotate with respect to the members 69, the latter may be projected and retracted to achieve the results aforenoted, such movements being effected by any suitable mechanical connection as, for example, rock shafts 72 and 119, to which crank arms 73 are secured and the outer ends of which arms are linked, as at 74, to the members 69.

Each of these assemblies of apparatus also includes an annular cylinder block 75 formed with a series of bores or cylinders having their axes parallel to the shafts 49 and/or 61. These cylinder blocks are rotatably mounted within the casing of the transmission, and it will be observed that the cylinder assemblies of each unit actually include two spaced blocks, the cylinders or bores of which are aligned, so that inter-connecting pistons 76 may alternately ride into the opposed cylinders of the different blocks. The pistons are formed integral with or are firmly secured to connecting brackets 77, having arms, the inner faces of which rockingly mount slipper elements 78. These elements slidably contact the opposite side faces of the plate 63, and it will thus be understood that if the unit associated with the shaft 61 is viewed as a pump, a turning of this shaft relative to the cylinder blocks 75 encircling the same (with the wobble plate in the position shown) causes reciprocation of the pistons within the cylinders which accommodate the same. It will, of course, be understood that any one of a number of obvious constructions could be employed to allow of any proper degree of extreme angularity on the parts of plates 63 and to also assure of constant contact between the blocks or slipper elements 78 and the faces of the plates. To assure a proper guiding of the parts, the bracket element 77 may be formed with a suitable number of bores through which rods 79 pass, these rods having their opposite ends connected to the opposed cylinder blocks. Also, as shown especially in Fig. 7, the slipper elements 75 78 may have extensions or other suitable guiding provisions for preventing their displacement.

Obviously, as the rods 166 are adjusted to cause decreasing angularity on the part of the plates 63, the amount of reciprocation occurring on the part of the pistons is decreased to a corresponding extent. With the plate extending at right angles to the shaft mounting the same, no reciprocation will occur, and if one continues to shift the plate in the same direction, reverse reciprocation of the pistons will occur. In other words, when before the piston traversing a given zone was projected, it would now be in course of retraction while traversing such zone.

Each of the cylinder blocks is formed with gear teeth 80 or else has secured to its body a member providing such teeth. As aforestated, each of these blocks is rotatably supported, and this support may take the form of bushings 84 interposed between the inner face of each block and an extension forming a part of the casing section 37. In their outer faces each of these blocks may be grooved to receive the inwardly extending edge portion of a ring 81 mounted upon the casing by bolts 82 and carrying packing 83 of any suitable character, which rides against the outer face of each block. In this manner, the blocks are mounted for rotational movement. This structure, however, provides an additional factor, in that passages 85 are formed at a number of points between the outlet or pressure passages of the assemblies and the spaces which exist between the outer ends of the cylinder blocks and the packing 83. In this manner, and in view of the fact that the rings 81 are stationary, the cylinder blocks will be constantly forced outwardly and into sealing contact with the surfaces of the casing sections which abut their ends.

These sections have been best indicated in Fig. 6, taken in conjunction with Fig. 4. It will be observed that the one particular casing section shown at this point has compartments 87 and 88. The first of these is defined by a partition or wall 89 which has its body in the form of two sections, each including a radial series of branches as indicated at 90. Within each of these branches a port 91 is provided. Within the compartment 88 ports 92 are formed at points between the branches 90. The ports 91 and 92 provide two annular series of openings arranged to register with the outer ends of the cylinders or bores formed in the blocks 75 as the latter are shifted to permit of such registry. The ports 91 and 92 should be spaced so that the end of the cylinder may be entirely out of register with any port and sealed by contact with the surface of the casing section which it abuts.

The construction of a unit for motor and pump purposes and embodying an assembly of apparatus similar to the foregoing has heretofore been attempted. One difficulty in connection with a construction of this nature which has existed, however, is that with a ported member and cylinder blocks which are rotatable, it is essential that the contact or sealing provision between these elements be sufficiently intimate that no substantial escape of fluid can occur. This of necessity calls for considerable frictional engagement of these parts or auxiliary elements associated with them. Such intimate contact in turn prevents excessive relative rotation, in that the friction will be so great that a destructive action will be set up quite aside from the fact that a large mechanical loss will exist incident to the parts engaging and moving with respect to each other. This difficulty is overcome according to the present invention, in that, as afore brought out, the cylinder blocks are rotated, but this rotation does not involve a high speed of the parts relative to each other, although intimate and proper sealing contact does occur.

Considering one specific proposal for overcoming the difficulties heretofore enumerated, we may assume that the shafts 49 and 61 are rotating at 1400 R.P.M. and that the cylinder blocks are rotated at 200 R.P.M. Thus, in the case of a pump or pressure motor (i. e., not an internal combustion motor) each cylinder of the cylinder block in completing one rotation will be in cooperation with the piston reproduce six pressure actions and six suction actions. This, of course, is conceding that the wobble plate is presenting in effect a single dwell and a single cam surface. It will be understood by those skilled in the art that if this plate is actually a cam presenting a number of duplicate surfaces, the action afore noted will be multiplied according to the numbers of these groups of surfaces. Thus, in the embodiment illustrated there are six pairs of pressure ports and outlet ports 91—92. There are seven cylinders in cooperation with these pairs of ports. This is necessary in that to each revolution of the shafts 49 or 61 the cylinder block will be advanced fifty-one and three-sevenths degrees, and with the position of the ports fixed it will be necessary to have either one more or one less cylinder than there are pairs of ports. It is, of course, feasible to design an apparatus in which more than one pair of ports in excess of cylinders would be present, or in which there would be more than one cylinder in excess of the number of ports. However, in the interest of simplicity, and according to the preferred design, the cylinders of any given block should number one less or one in excess of the pairs of ports employed.

This results in a vernier action between the cylinder block and the ported member by which the cylinders, during a fraction of a revolution of the cylinder block—and a concurrent complete revolution of the driving shaft—are successively connected with an inlet and an outlet port corresponding in each case to the stroke of the piston. Consequently, this construction permits the carrying of sufficient pressure between the cylinder block and the ported member, while due to the low speed of rotation of the block the requirements of a thrust bearing are not exceeded, although the high contact pressure existing between the parts limits leakage. Of course, for any given pressure the power required to rotate the cylinder block is a fraction of the power required to rotate it with previous methods of construction, and the relation of the two power requirements are as their respective speeds of rotation. Summarized, the losses due to rotation of the cylinder block are much lower, incident to the low speed of movement of this block, and the leakage is much less, due to the possibility of carrying high pressures between the cylinder block and the ported member.

While it is, of course, feasible to assure sealing contact between the cylinder block and ported member in a number of different manners, it is preferred, as heretofore brought out, to employ ports 85 communicating with a space existing between the member 81 and the outer flanged portion associated with the outer ends of the cylinder block. In this manner, fluid under high pressure is forced into this space, and acting against the packing 83 in effect forces the cylinder into intimate contact with the ported member. Before concluding consideration of this point, attention is directed to Fig. 10, from which it will be obvious that, if desired, the outer flange of each cylinder block might be formed by a separate plate 93, which may be applied in position after the member 81 and the packing 83 carried thereby are properly disposed with reference to the side wall of the block. Also, as shown in Fig. 11, the ports 94, formed in the plate 93, may have a configuration corresponding to the outline of the ports 91 and 92.

As afore brought out, the cylinder blocks are rotated, such rotation being preferably effected by employing gears or gear portions 80. As illustrated in Fig. 9, these gear portions are engaged by gears 95 secured to a shaft 96 suitably mounted for rotation by the several casing sections 37. Shafts of this nature are provided one for each of the two units and rotation of one of these shafts is assured by having associated with the same a gear 97 meshing with a gear 98 fixed to the shaft 61, while the shaft for the second unit is similarly rotated by a gear or gear portion 97 meshing with a gear 99 moving with the shaft 49. The relationship of the several gears 98 or 99 and 97, 95, and 80 is such that the ratios afore indicated occur, i. e., to each rotation of the driving or driven shaft a one-seventh rotation of the cylinder block occurs. Of course, if one or more cylinders than pairs of ports is employed, the rotation of the cylinder block will be in a direction similar to the shaft, while if one less cylinder than pairs of ports is employed, such rotation will be counter to the direction of rotation of the shaft.

With the foregoing construction present, and if the shaft 49 is maintained stationary, we have heretofore traversed the fact that the gear 45 will cause an accelerated motion on the part of ring gear 56, which motion will be transmitted through gear 60 to the shaft 61. If the wobble plate 63 of the lower unit (as viewed in Fig. 4) is in a position at right angles to the axis of the shaft 61, it is apparent that under these circumstances no driving of the parts, and especially the shaft 49, will occur. In other words, while the cylinder block of this unit will rotate, carrying with it the pistons, no reciprocation of the latter will occur. If now the shaft 72 is adjusted to cause the rod 166 to shift and to correspondingly incline the plate 63 of this unit with respect to its former position, the pistons will be reciprocated to expel oil or other suitable fluid with which the apparatus is filled through the ports 91 and to draw fluid through ports 92. Still considering Fig. 4 and with the plate of the upper unit in the position shown, this flow of fluid will cause the upper unit to be driven as a motor. In other words, the pistons of this unit will be reciprocated, and incident to the slip elements 78 the plate of the upper unit will be rotated at relatively high speeds, thus correspondingly rotating the shaft 49. Splined or otherwise suitably secured to this shaft is a gear 100, the teeth of which mesh with a gear 101 secured to the driving axle 12. Now as the shaft 49 begins to rotate, the gear 45 will not solely drive the gear 56, but the gear or gear portions 55 will also be driven by the planetary gears 54. As the inertia to movement is overcome, the speed of rotation of the shaft 49 will increase so that a constantly greater amount of the drive will be transmitted directly by the gearing 45, 54 and 55 to the shaft 49, and a condition will finally exist wherein the gear 56 will rotate at constantly decreasing rates of speed and gradually cease movement altogether. Of course, assuming that the speed of driving gear 45 remains practically constant, a diminution of rotational speed on the part of shaft 61 will cause constant acceleration on the part of shaft 49. When shaft 61 completely ceases to rotate, it is apparent that a direct drive will follow from gear 47 through the planets 54 to gear or gear portion 55, thus rotating shaft 49 at high speeds. In fact, and for the reason that gear 56 is stationary, this condition might almost be likened to an overdrive. In other words, the teeth of the planets will engage the fixed teeth of the gear 56 and drive at accelerated speed the gear 55. While the ratio might be varied in numerous respects, the parts as illustrated would cause the shaft 49 to be driven at approximately 1200 R. P. M. with the gear 47 being driven at approximately 400 R. P. M., this, of course, being predicated upon the assumption that gear 56 remains stationary. The shaft 61 will gradually cease rotation because the unit which has heretofore been the motor (i. e., the upper unit as viewed in Fig. 4) will be controlled to cause the plate of the same to assume a position increasingly at true right angles to the axis of the shaft 49. As this condition is approximated, the pistons in the upper unit can no longer reciprocate, and viewed from one aspect one might state that under these circumstances the entire upper unit acts as a valve mechanism which prevents a flow of fluid from the lower unit, which has heretofore been acting as a pump. The governing means which achieves this result will be hereinafter described in detail, but short of reaching the condition afore noted, it will be apparent that as the speed of the upper unit (acting as a motor) increases, the speed of rotation of shaft 49 increases and the amount of the drive directly from the gear 47 through the gears 54 and 55 also increases. This is caused by a drop of pressure in the entire system incident to a shifting of the plate 63 of the lower unit responsive to an action of the parts as hereinafter brought out. Of course, when the upper unit acts as a valve and refuses any fluid from the lower unit, then the lower unit is substantially stopped from movement. Under these circumstances, gear 56 will not turn, and substantial stoppage of shaft 61 follows. It will, of course, be understood that complete stoppage of the shaft 61 will probably never occur, or else will occur for only a very small fraction of the time during which the unit is operating. However, with the shaft 61 substantially stationary, it will be understood that the so-called "direct drive" afore noted will occur. Also (as afore noted) this drive will actually result in the shaft 49 rotating substantially three times as fast as the gear 47 is rotated. If, now, the upper unit has its plate shifted to a point at which such unit begins to function as a pump, and a position of the plate of the lower unit is such that it extends less than at right angles with respect to the axis of the shaft 61, it will begin to function as a motor. In functioning in the latter manner, it will obviously rotate in a direction counter to the direction in which it has heretofore been rotating. This will cause the shaft 61 to be driven in a similar direction and the gear 60 will now become a driving gear serving to rotate the gear 56 in a direction contrary to that in which it has heretofore been rotating. Such driving will be transmitted by the planets 54 and consequently the shaft 49 will have its rotation accelerated. Under these circumstances, and operating under maximum conditions, the shaft 49 will be rotated approximately six times to each revolution of the gear 47. In other words, we have heretofore seen that a substantially three to one drive occurs with the shaft 61 stationary or substantially stationary, with the upper unit operating as a pump and the lower one operating as a motor. This effect will be multiplied by two, giving the results afore noted. Of course, the ratio of the various parts might be altered in numerous respects so as to vary the final ratio as desired. Likewise, and at the opposite extreme of operation of the unit, the parts as shown will cause substantially one rotation of the shaft 49 to each five revolutions of the gear 47. This is again a matter of design, and the ratio of the parts might be varied to suit any special requirement of a given installation.

Returning to consideration of Fig. 6, it will be apparent that there is no difficulty involved in the interconnection of the upper and lower units of the transmission in that they are permanently connected through the compartments or areas 87 and 88. When the lower unit acts as a pump, fluid is forced out of the ports 91 through the compartment 87 and towards the upper unit, when such fluid again passes through the ports 91 aligned with the cylinders to project the pistons. The fluid supplying the cylinders of the lower unit follows through compartment 88 to ports 92 and through such ports into the cylinders in registry with the same. Fluid expelled from the cylinders of the upper unit flows through the ports 92 of such unit, and thus reaches the compartment 88. Of course, when the plate of the upper unit is in a position such that this unit acts substantially as a valve, then substantially no fluid will flow from either compartment. Conversely, when the upper unit acts as a pump, fluid under pressure will be expelled from the ports 91 of such unit and be received through the correspondingly identified ports of the lower unit to drive the latter as a motor. An oil sump 102 is provided adjacent compartment 88 and communicating with the same through openings 103, it being, of course, obvious that any other and suitable substitute might be employed in lieu of the sump.

Communicating with compartment 87 by means of passages 104 are cylinders 105—106, which may be formed in the casing of the transmission or in a block arranged in juxtaposed relation thereto. One cylinder forms a part of the governing means for one unit and air cylinders 107—108 are arranged adjacent the cylinders 105—106 and are connected respectively to the tubes 31—32 and 33—34. In each of the air cylinders a piston 109 is mounted, this piston being mounted by or coupled to a rod 110 and serving in its reciprocation to oscillate—in the case of cylinder 107—shaft 111 and in the case of cylinder 108—shaft 112. The valves associated with controls 29 and 30 are preferably of a type which will: (a) connect the tubes 31 and 33 with a source of compressed air flowing through pipes 113; (b) will connect tubes 32 and 34 to such source of compressed air; (c) will allow the compressed air to escape from these tubes. Valves having these characteristics are well known to those skilled in the art, and it has, therefore, been considered unnecessary to illustrate them in detail.

Disposed in each of the cylinders 105—106 are pistons 114. Each of these pistons is constantly urged to assume a fully retracted position by means of a spring 115. The spring associated with cylinder 105 may be more powerful than the spring associated with cylinder 106. The pistons 114 are connected to or mounted by rods 116 extending beyond the ends of the cylinders, and these rods are connected to shafts 117 and 118 so that as the rods are projected and retracted these shafts will oscillate.

Now, referring to Figs. 12 to 15, it will be observed that there has been diagrammatically illustrated the parts just described, as well as the linkage coupling the same to the shaft 72 governing the position of the plate of the lower unit, and shaft 119 governing the position of the plate of the upper unit. In these views, and for the sake of avoiding confusion, piston rods have not been shown; nor have the connections which exist between the shafts 72 and 119 and the wobble plates been illustrated. Considering especially Fig. 12, it is to be understood that the full line position of the parts shown indicates the positions these parts assume under the initial stages of forward drive. The positions indicated in dotted lines in this view is the condition of the parts under the so-called "neutral" condition of the transmission. Connected to shafts 112 and 111 by means of arms 120 and 121 are rods 122 and 123. The first of these rods has its outer end pivotally connected to a lever 124 which has its lower end pivotally supported as at 125. This lever is link-connected as at 126 to a second lever 127 which has pivotally connected to it the outer end of rod 123, such connection occurring at a point short of the end of lever 127. This end of the lever is connected by a link 128 to a lever 129 and at a point midway between the ends of the latter. Secured to one end of lever 129 is a link 130 which connects through to crank 131 to shaft 119. Secured to the opposite end of lever 129 is a link 132 connected by a crank 133 to shaft 118. A lever 134 has its body rockingly connected by a link 135 to the lever 124. One end of lever 134 is connected by a rod 136 to a crank 137 secured to shaft 72, while the oppposite end of this lever is connected by a rod 138 to a crank 139 coupled to shaft 117.

With the parts in the position shown in dotted lines in Fig. 12, it will be apparent that controls 29 and 30 have been shifted in such manner that the piston within cylinder 108 is in "neutral" position, while the piston within cylinder 107 is maintaining the parts in "ahead" position. The plate of the upper unit will, under these circumstances, have assumed the position indicated in dotted lines incident to the fact that the spring 115 within the cylinder 106 will have rocked the shaft 118 in a clockwise direction, with the result that shaft 119 will have been rocked in a counter-clockwise direction, thereby resulting in this positioning of the parts. This follows because substantially no pressure will exist within cylinders 105 or 106 for the reason that the plate of the lower unit will be in a position substantially at right angles to the axis of the shaft 61. Consequently, with the gear 47 driving, the only action which occurs is a spinning of the plate of the lower unit with no reciprocation on the part of the pistons. However, as air pressure is admitted into cylinder 108, due to a shifting of control 30, the piston within this cylinder is caused to assume the position shown in full lines in Fig. 12. This will result in the plate of the lower unit being caused to assume a slightly inclined position, so that the pistons of such unit will begin to reciprocate and pressure will now be built up within compartment 87 and be transmitted through ports 91 to the cylinders of the upper unit. Also, due to the shifting of the piston within cylinder 108, the linkage will have been shifted to cause the shaft 119 to rock so as to shift the plate of the upper unit from the position indicated in dotted lines to the position shown in full lines. Consequently, the upper unit is now ready to act as a motor, and the pressure produced within compartment 87 by the lower unit results in the plate of the upper unit being rotated. As heretofore traversed, the pressures under these conditions may be relatively great, but as soon as shaft 49 begins to pick up speed, the pressure will diminish, and this diminution of pressure allows the pistons within cylinders 105-106 to shift in response to the urging of the springs 115, so that a condition such as is illustrated in Fig. 13 occurs. As seen in this figure, the plate of the upper unit is in a position substantially at right angles to the axis of its shaft 49. The position of the plate of the lower unit is such that it extends at a considerable angle with respect to the perpendicular. Under these circumstances we have already traversed the fact that the upper unit will, in effect, act as a valve, thereby substantially locking the lower unit, and especially the shaft 61, against rotation. This is the condition of so-called "direct drive", in which, actually, with the parts proportioned as shown, a substantially one to three drive occurs on the part of gear 47 with respect to gear 100. If, of course, with the parts reaching this condition, a suddenly increased load should be thrown on the transmission, as would be the case if the vehicle had reached an abrupt grade, then the parts might remain in the position shown in Fig. 13, or might, in fact, drop back to the position shown in full lines in Fig. 12. It should be borne in mind that according to the preferred embodiment of this invention, the engineer will only shift the controls to, for example, "ahead" and "go", and the parts automatically assume proper conditions with respect to each other, incident to the pressure which exists in compartment 87, and which pressure is, in turn, transmitted to cylinders 105 and 106, to produce the results desired. With no unusual condition present, however, the piston of cylinder 106 will shift from the position shown in Fig. 13 to the position shown in Fig. 14. It will be borne in mind that the spring 115, cooperating with this piston, is relatively weak when viewed in conjunction with the spring associated with cylinder 105. Therefore, so long as material pressure exists, the spring of cylinder 106 will be incapable of shifting the piston to its fully retracted position. With a tendency of the torque of shaft 49 to drop, it will be found that the pressure within cylinder 106 will drop to an extent such that it may shift to the position shown in Fig. 14. This will not affect the position of the plate of the lower unit, but will cause the plate of the upper unit to assume what might be termed a "reverse" position. Consequently, the upper unit will now begin to function as a pump, and the lower unit will be driven as a motor, thus driving the shaft 61, with the results aforenoted.

The parts will remain in the position shown in Fig. 14, even if a down grade is encountered and even if the axles 12 are driving the transmission rather than the prime mover driving the axles. Under such circumstances, the shaft 49 would present a minus torque, and consequently the piston of cylinder 106 would be free to shift to its extreme of travel. This would cause the effective displacement of the cylinders of the upper block to equal the effective capacity of the cylinders of the lower block, despite the fact that the plate of the lower block will be in the extreme position of angularity. Consequently, an effect will be presented which one might term as being in the nature of "free wheeling"; but it will again be understood that the instant the shaft 49 presents resistance to driving, the parts will return to the position shown in Fig. 14, and if the resistance continues, or increases, these parts might, in fact, drop back to the position shown in Fig. 13, or in full lines in Fig. 12.

With the vehicle—or any other unit to which the transmission is applied—reaching a stationary condition, the engineer is free to throw the parts into reverse. This has been illustrated in Fig. 15. It will, of course, be understood that control 30 is primarily brought to a neutral condition. Control 29 is thereupon brought to a condition such that a reverse drive is to be effected. Thereupon, if control 30 is actuated, so that the latter assumes the "go" position, the pistons within cylinders 107 and 108 are shifted to the right as viewed in Figs. 5 and 15. Incident to the linkage the plates of the two units are also shifted so that the plate of the lower unit again assumes the position shown in full lines in Fig. 12. However, the plate of the upper unit is shifted to the position which it has assumed under the condition of the parts described under Fig. 14; or, in fact, this plate may even shift up to the extreme position which it would have assumed under "free wheeling" conditions. This positioning of the parts, and despite the existence of pressure in cylinder 106, will occur, due to the deliberate shifting of the mechanism incident to the air pressure existing in cylinder 107, which will cause such shifting of the piston. Under these circumstances, it will, of course, be understood that rotation of the gear 47 will cause rotation of the hubs 51—53. However, due to the fact that the inclination of the upper plate has been reversed, the shaft 49 will offer far greater resistance to turning than was the case when the parts were in the position shown in full lines in Fig. 12. Consequently, the shaft 61 is turned, and the lower unit acts as a pump to drive the upper unit as a motor in a direction reverse from that which, under preceding conditions, it has been rotating. This naturally results in a reverse driving of the shaft 49, and any tendency of the planets 54 to drive the shaft 49 in an opposite direction will be overcome by the power exerted by the upper unit.

As has been described, the operation of the transmission consists of changing the speed relation of the output shaft with respect to the input shaft by a variation of the speed (both in magnitude and direction) of the third member of the differential gearing, which third member is not fixed to either the output or the input shaft.

This third member, however, drives (or is driven by) the hydraulic unit associated with shaft 61. Consequently, a variation of the speed ratio of the output shaft with respect to the input shaft will produce a variable capacity in the hydraulic unit of which shaft 61 is a part.

Since due to the nature of the differential gearing all forces acting on all components of the differential are in a constant relation, shaft 61 will be turned by a constant torque irrespective of its speed, this torque being applied even when shaft 61 is stationary, as in Fig. 13. (It is assumed that the torque of the prime mover is constant, but if it varies, all the other forces in the differential vary likewise, in consequence of which fact the torque on shaft 61 is constant with respect to all the forces of the gearing.)

It will be seen from Figs. 12–15, and Figs. 3, 5 and 6 which show the controls, that it is possible to change the pressure of oil delivered by either hydraulic unit at a given torque, by changing the inclination of the plates 63 (Fig. 9).

Considering, for example, the parts as illustrated in full lines in Fig. 12, it will be understood that the pressure delivered by the lower unit is very high, due to the small inclination of its plate. Consequently, the force on the upper motor unit is very much higher than that driving the lower unit, due to the fact that the inclination of the plate of motor unit is very much greater than that of the pump unit, the pressure being equal in both units.

It must be understood that the oil pressure exists in the system solely due to resistance to turning on the part of shaft 49, and varies directly as such resistance. Consequently, as the resistance to turning decreases, the oil pressure will likewise decrease, causing the controls (Fig. 5) to assume a position more nearly like that shown in Fig. 13.

As the resistance decreases still further, the controls will move in the direction of the positions shown in Fig. 14, in which case, from the standpoint of the hydraulic system, the transmission will be in a true condition of overdrive.

With reference to Fig. 8, it is seen that one of the advantages of this system of power transmission is the fact that during the running of the locomotive only a part of the power is transmitted by the hydraulic system. Thus, it will be seen that if the resistance to driving is such that the parts assume the position illustrated in Fig. 13, the upper unit will act as a valve, refusing oil from the lower unit, and in effect the hydraulic system will transmit no power. This condition is shown at point $a$ in Fig. 8. The ratio at that point is identified arbitrarily R:1, and corresponds to a road speed of roughly 90 M. P. H. on one type of locomotive.

If, now, the resistance rises, the controls will be actuated, due to the rising oil pressure, as above described, and will cause a change of ratio in the direction of R:6 (Fig. 8), which corresponds to the position of the parts as shown in Fig. 12. Under these circumstances, more and more power will be transmitted hydraulically, in the relation of:

Power transmitted hydraulically $= 100\% \left(\dfrac{R-1}{R}\right)$

Power transmitted mechanically
$= 100\% - 100\% \left(\dfrac{R-1}{R}\right)$ (This condition does not hold true for ratios of higher than R:1, the relation in that range being as shown by the part $a$—$d$ of curve of Fig. 8).

This relation is shown by the curve of Fig. 8, which divides the total power into zone $b$, or power transmitted mechanically; and zones $c$, or power transmitted hydraulically.

By virtue of the design, the actual reduction ratio is approximately R:16, but the relations shown in Fig. 8 and described above hold true for any ratio.

In the case of the overdrive, the highest possible ratio is one in which all the power is transmitted hydraulically, and it corresponds to approximately R:½, due to the properties of the differential gears. That is, shaft 49 will turn approximately twice as fast as it does under conditions of point $a$ and ratio R:1.

Summarizing, at the start almost all the power is transmitted hydraulically at high pressure. As pressure drops, less and less power is transmitted hydraulically, and more and more mechanically, in the relations of the curve of Fig. 8, the amounts of power transmitted hydraulically and mechanically being dependent solely on the ratio with respect to point $a$.

At the point $b$, corresponding to Fig. 13, no power is transmitted hydraulically. Beyond that, in the direction of still lower ratios (Fig. 14), the amount of power transmitted again increases as shown in Fig. 8.

Briefly reviewing the teachings of the present invention, it will be understood that a transmission is provided which, as afore brought out, may be used in connection with hoisting machinery as well as road and rail vehicles. It may also be employed in such associations and may be coupled to a turbine or similar prime mover, although it will probably find its primary utility when coupled to an internal combustion motor of either the Diesel or gasoline types. When so employed it functions perfectly in lieu of a generator-motor installation, and efficiently transmits power. The employment of a mechanical transmission of a conventional nature is, of course, not feasible, because the power developed by the prime mover is such that a more or less conventional transmission employing a clutch could not withstand the strains of such association for any reasonable period of time. The use of a transmission of the nature proposed in the present application and in lieu of a generator-motor transmission is dictated by virtue of the saving of expense, aside from the fact that it is additionally possible to economize on gross weight, and also in the continued maintenance thereof. Moreover, a relatively unskilled person can operate the present transmission, whereas the services of highly skilled engineers are necessary to an installation embodying, for example, a Diesel motor coupled to a generator and in turn coupled to a driving motor which is finally coupled to driving axles or their equivalents. Proper torque is developed by the present transmission under all conditions of load, and the parts automatically shift and adjust themselves in accordance with this load and with a view to preserving a proper balance or ratio of drive between what might be termed the mechanical side of the transmission and the hydraulic side thereof.

Viewing the illustrated embodiment of the invention, and briefly traversing the operation of the several parts, it will be appreciated from a review of the foregoing that with the prime mover 14 operating, the shaft 17 and sleeve 18 are operated to constantly drive shafts 26 and hence gears 47. With the controls 29—30 in their proper condition (i. e., neutral, as shown in dotted lines in Fig. 12), the rotation of gear 47 simply causes, through planets 54, a rotation of gear 56, thus driving gear 60 and shaft 61. This, however, does not result in a reciprocation of pistons 76, due to the fact that the plate 63 of the lower unit extends in a plane perpendicular to the axis of the shaft 61, and consequently no pressure is built up in chamber 87, so that there will be no driving force transmitted to the pistons of the upper unit. As a result, there will be no real tendency on the part of shaft 49 to turn, and consequently gear 100 will remain stationary. The operation of controls 29—30 to cause a shifting of the parts to the positions shown in Fig. 12, results in the rotor or plate of the lower unit being shifted angularly and in the plate of the upper unit being shifted to a position at which such upper unit may act as a motor. Consequently, pressure is built up within chamber 87 and the upper unit reacts to turn shaft 49. This will cause rotation of gear 100, a consequent driving of gear 101, and a driving of the axle connected thereto. As the speed of drive of shaft 49 increases, the pressure in chamber 87 will drop, and the parts will assume the position shown in Fig. 13. In such positions, the upper unit refuses to receive fluid pumped by the lower unit and consequently the latter reaches a point where it is substantially locked or stationary and shaft 61 will not turn. The gear 60 will, under these circumstances, be stationary and restrain the gear 56 from moving. With a continuation of drive from gear 47 this will cause planets 54 to drive the shaft 49 at a relatively high speed. As this speed increases (and the pressure within compartment 87 continues to drop) the parts finally shift to the positions shown in Fig. 14, in which the shaft 61 is again rotated, but in a direction counter to its previous direction of rotation, which occurs due to the fact that the upper unit is now acting as a pump and the lower unit is acting as a motor.

In this connection, it will be appreciated that the plate of the upper unit is so mounted, and that its governing mechanism is of such a nature, that this plate may swing from the extreme position indicated in dotted lines in Fig. 12 (or even beyond such position) to the position indicated in full lines in this figure. The plate of the lower unit, however, is preferably so arranged that while it may swing in a clockwise direction and away from a position perpendicular to the axis of shaft 61, it cannot swing in a counter-clockwise direction to a point beyond such perpendicular position.

As heretofore traversed, a reverse driving of the parts is assured by bringing the mechanism to a neutral condition and with the shaft 49 stationary. After this, by shifting the plates of the upper and lower units to assume the positions shown in Fig. 15, the lower unit will again function as a pump, and the upper unit as a motor, but the direction of rotation of the latter unit will be counter to the direction in which it has heretofore removed.

Before concluding consideration of the mechanism aforedescribed, it is desired to emphasize that while it may be conceivable to design units in which various numbers of ports and cylinders are employed, it is preferred, in order to produce a commercially acceptable form of unit, and is one of the primary teachings of the present invention, to utilize either one pair of ports in excess of the number of cylinders employed, or to use one cylinder in excess of the pair of ports which are employed. As a consequence of this feature, the cylinder block will be in proper sealing contact with the ported member, but the relative speeds of these members will not be sufficiently high to result in difficulties being encountered. Additionally, the differential system should preferably include, as illustrated, gears, and especially ring and sun gears, between which are interposed planet gears. Other arrangements of a differential system are, however, possible, and, in fact, under certain conditions differential systems might be devised which might not rely upon mechanical gears. Moreover, while one convenient form of control has been illustrated and described, it is apparent that this control, and especially the linkage forming a part thereof, might be modified or drastically revised.

With reference to the alternative form of differential mechanism illustrated in Fig. 16, it will be noted that the reference numerals 49 and 61 identify the shafts heretofore identified by these numbers and despite the fact that a slightly different arrangement of these parts is present. Suffice it to say that these shafts are connected to the upper and lower hydraulic units heretofore described, or to functional equivalents thereof. The gear 140 secured to shaft 49 is the gear which corresponds to gear 100 in the preceding views. In line with the end of shaft 49 a second shaft 141 is provided, and this shaft is connected through gears 142 and 143 to rotate the shaft 61. Rotatably mounted upon the shafts 141 and 49 and adjacent the inner ends thereof is a casing 144 which provides within its body two chambers which are eccentric to the axes 141 and 49. These chambers each accommodate rotors 145 mounting sliding vanes 146, and communication between the intervening wall 147 of these chambers is afforded by ports 148. Formed in the periphery of the casing 144 or otherwise suitably associated therewith are an annular series of gear teeth 149 which correspond in function to the gear or series of teeth 47 as heretofore described.

With this form of construction it is apparent that with a driving force acting to rotate the casing 144 and with the gear 140 held substantially stationary incident to the resistance to its movement, such turning of the casing will cause a pumping action within its right hand compartment as viewed in Fig. 16. In view of the fact that a completely trapped system is present, the fluid under pressure cannot flow except through the proper port 147 and contact the blades of the left hand rotor as viewed in Fig. 16. Accordingly, the latter must act as a motor, driving the shaft 141, and thru rotating the shaft 61. When the action heretofore traced in connection with the upper and lower units takes place, and the shaft 61 assumes a substantially stationary condition, it is apparent that shaft 141 will be likewise affected, and thus the left hand unit within the casing 144 will begin to act as a pump, driving the rotor within the right hand casing and accelerating the movement of shaft 49. When, of course, the shaft 61 actually begins to act as a driving shaft, the condition just described will be aggravated to an extent such that the speed of rotation of the right hand rotor within the casing 144 will be accelerated to a marked degree.

With a view to harmonizing this structure to the structure heretofore described, the volume of the units is preferably such that the left hand unit bears a ratio of 3 to 1 with respect to the right hand unit within casing 144. Accordingly, with the initial condition of the parts, i. e., the shaft 49 stationary and the casing 144 turning, the shaft 141 will be turned at a speed approximately one third as great as the casing is turning. Conversely, with the shaft 61 substantially stationary, the right hand unit within casing 144 and the shaft 49 will be rotated at a speed equal to the speed of rotation of casing 144 plus a three time overdrive.

If a planetary transmission is employed, it is to be understood that the driving member should preferably be the planet mounting unit. In this manner a more efficient form of drive results, and the drive is less likely to embody objectionable noise factors.

To those skilled in art it will readily be apparent that the teachings of the invention, especially that the reference to the units, might be extended to provide desirable forms of internal combustion motors, pumps and pressure-operating motors capable of use in numerous different associations.

From the foregoing, it will be appreciated that, among others, the several objects of the invention afore noted are achieved. It will additionally be understood that numerous changes of construction, rearrangement of the parts, and changes in proportions and ratios of the parts might be resorted to to meet the requirements peculiar to any given installation and without departing from the spirit of the invention as defined by the claims.

Having thus described the invention, what is claimed is:

1. A transmission including, in combination, driving and driven shafts, a gearing comprising a plurality of inter-meshing and relatively rotatable elements, one of said elements being connected to rotate with said driving shaft, a second of said elements being connected to rotate with said driven shaft, a fluid pump and motor, both said pump and motor being of the type which, when inoperative, will provide barriers to a flow of liquid and each including a plurality of cylinders, valve mechanisms forming a part of said pump and motor, said valve mechanisms each presenting a plurality of pairs of ports different in number from the number of cylinders forming parts of said pump and motor, the outlet port of one pair being disposed adjacent the inlet port of the next succeeding pair each of said pairs of ports including an intake port and an exhaust port, said valve mechanisms being movable with respect to the cylinders of said pump and motor, means for effecting such relative movement and providing for a vernier action of said valve mechanisms with respect to said cylinders, means providing fluid passages extending between the exhaust ports of the pump valve mechanism and the intake ports of the motor valve mechanism as well as between the exhaust ports of the latter mechanism and the intake ports of the pump valve mechanism, said passages providing paths through which fluid may freely flow without reduction of pressure, pistons reciprocable within said pump and motor cylinders, means for connecting the pistons within said motor cylinders to said driven shaft, and a third element forming a part of said gearing and driven by and intermeshing with the first named elements which form a part of said gearing, said third element being connected to the pistons within said pump cylinders for effecting reciprocation of said latter pistons, the movements of the ports of the valve mechanisms with respect to the cylinders being so timed that a piston within a pump cylinder will be performing a discharge stroke while the outlet port of the pump valve mechanism affords communication through the passage to an inlet port of the motor valve mechanism and to a cylinder of the latter while the piston therein is performing a working stroke.

2. A transmission including, in combination, driving and driven shafts, a gearing comprising a plurality of inter-meshing and relatively rotatable elements, one of said elements being connected to rotate with said driving shaft, a second of said elements being connected to rotate with said driven shaft, a fluid pump and motor, both said pump and motor being of the type which, when inoperative, will provide barriers to a flow of liquid and each including a plurality of cylinders, valve mechanisms forming a part of said pump and motor, said valve mechanisms each presenting a plurality of pairs of ports different in number from the number of cylinders forming parts of said pump and motor, the outlet port of one pair being disposed adjacent the inlet port of the next succeeding pair, each of said pairs of ports including an intake port and an exhaust port, said valve mechanisms being movable with respect to the cylinders of said pump and motor, means for effecting such relative movement and providing for a vernier action of said valve mechanisms with respect to said cylinders, means providing fluid passages extending between the exhaust ports of the pump valve mechanism and the intake ports of the motor valve mechanism as well as between the exhaust ports of the latter mechanism and the intake ports of the pump valve mechanism, said passages providing paths through which fluid may freely flow without reduction of pressure, pistons reciprocable within said pump and motor cylinders, means for connecting the pistons within said motor cylinders to said driven shaft, a third element forming a part of said gearing and driven by and intermeshing with the first named elements which form a part of said gearing, said third element being connected to the pistons within said pump cylinders for effecting reciprocation of said latter pistons, the movements of the ports of the valve mechanisms with respect to the cylinders being so timed that a piston within a pump cylinder will be performing a discharge stroke while the outlet port of the pump valve mechanism affords communication through the passage to an inlet port of the motor valve mechanism and to a cylinder of the latter while the piston therein is performing a working stroke, and means for varying the length of travel of the pump pistons to correspondingly vary and interrupt the displacement of fluid by said pump.

3. A transmission including, in combination, driving and driven shafts, a gearing comprising a plurality of inter-meshing and relatively rotatable elements, one of said elements being connected to rotate with said driving shafts, a second of said elements being connected to rotate with said driven shaft, a fluid pump and motor, both said pump and motor being of the type which, when inoperative, will provide barriers to a flow of liquid and each including a plurality of cylinders, valve mechanisms forming a part of said pump and motor, said valve mechanisms each presenting a plurality of pairs of ports different in number from the number of cylinders forming parts of said pump and motor, the outlet port of one pair being disposed adjacent the inlet port of the next succeeding pair each of said pairs of ports including an intake port and an exhaust port, said valve mechanisms being movable with respect to the cylinders of said pump and motor, means for effecting such relative movement and providing for a vernier action of said valve mechanisms with respect to said cylinders, means providing fluid passages extending between the exhaust ports of the pump valve mechanism and the intake ports of the motor valve mechanism as well as between the exhaust ports of the latter mechanism and the intake ports of the pump valve mechanism, said passages providing paths through which fluid may freely flow without reduction of pressure, pistons reciprocable within said pump and motor cylinders, means for connecting the pistons within said motor cylinders to said driven shaft, a third element forming a part of said gearing and driven by and intermeshing with the first named elements which form a part of said gearing, said third element being connected to the pistons within said pump cylinders for effecting reciprocation of said latter pistons, the movements of the ports of the valve mechanisms with respect to the cylinders being so timed that a piston within a pump cylinder will be performing a discharge stroke while the outlet port of the pump valve mechanism affords communication through the passage to an inlet port of the motor valve mechanism and to a cylinder of the latter while the piston therein is performing a working stroke and means for varying the length of travel of the motor pistons and within the cylinders of said motor whereby to vary and interrupt the flow of fluid from said pump to said motor.

4. A transmission including, in combination, driving and driven shafts, a gearing comprising a plurality of inter-meshing and relatively rotatable elements, one of said elements being connected to rotate with said driving shaft, a second of said elements being connected to rotate with said driven shaft, a fluid pump and motor, both said pump and motor being of the type which, when inoperative, will provide barriers to a flow of liquid and each including a plurality of cylinders, valve mechanisms forming a part of said pump and motor, said valve mechanisms each presenting a plurality of pairs of ports different in number from the number of cylinders forming parts of said pump and motor, the inlet port of one pair being disposed adjacent the inlet port of the next succeeding pair each of said pairs of ports including an intake port and an exhaust port, said valve mechanisms being movable with respect to the cylinders of said pump and motor, means for effecting such relative movement and providing for a vernier action of said valve mechanisms with respect to said cylinders, means providing fluid passages extending between the exhaust ports of the pump valve mechanism and the intake ports of the motor valve mechanism as well as between the exhaust ports of the latter mechanism and the intake ports of the pump valve mechanism, said passages providing paths through which fluid may freely flow without reduction of pressure, pistons reciprocable within said pump and motor cylinders, means for connecting the pistons within said motor cylinders to said driven shaft, a third element forming a part of said gearing and driven by and intermeshing with the first named elements which form a part of said gearing, said third element being connected to the pistons within said pump cylinders for effecting reciprocation of said latter pistons, the movements of the ports of the valve mechanisms with respect to the cylinders being so timed that a piston within a pump cylinder will be performing a discharge stroke while the outlet port of the pump valve mechanism affords communication through the passage to an inlet port of the motor valve mechanism and to a cylinder of the latter while the piston therein is performing a working stroke and means for varying the distance travelled by the pistons within both said pump and motor cylinders whereby to vary in inverse proportion the fluid displaced by said pump and receivable in said motor and to interrupt such fluid flow.

5. A transmission including, in combination, driving and driven shafts, a gearing comprising a plurality of inter-meshing and relatively rotatable elements, one of said elements being connected to rotate with said driving shaft, a second of said elements being connected to rotate with said driven shaft, a fluid pump and motor, both said pump and motor being of the type which, when inoperative, will provide barriers to a flow of liquid and each including a plurality of cylinders, valve mechanisms forming a part of said pump and motor, said valve mechanisms each presenting a plurality of pairs of ports different in number from the number of cylinders forming parts of said pump and motor, the outlet port of one pair being disposed adjacent the inlet port of the next succeeding pair each of said pairs of ports including an intake port and an exhaust port, said valve mechanisms being movable with respect to the cylinders of said pump and motor, means for effecting such relative movement and providing for a vernier action of said valve mechanisms with respect to said cylinders, means providing fluid passages extending between the exhaust ports of the pump valve mechanism and the intake ports of the motor valve mechanism as well as between the exhaust ports of the latter mechanism and the intake ports of the pump valve mechanism, said passages providing paths through which fluid may freely flow without reduction of pressure, pistons reciprocable within said pump and motor cylinders, means for connecting the pistons within said motor cylinders to said driven shaft, a third element forming a part of said gearing and driven by and intermeshing with the first named elements which form a part of said gearing, said third element being connected to the pistons within said pump cylinders for effecting reciprocation of said latter pistons, the movements of the ports of the valve mechanisms with respect to the cylinders being so timed that a piston within a pump cylinder will be performing a discharge stroke while the outlet port of the pump valve mechanism affords communication through the passage to an inlet port of the motor valve mechanism and to a cylinder of the latter while the piston therein is performing a working stroke and means whereby said pump may be rendered inoperative to drive said motor, said third gearing element thereby providing a reaction point contributing to the driving of said second named element by said first named element.

6. A transmission including, in combination, driving and driven shafts, a gearing comprising a plurality of inter-meshing and relatively rotatable elements, one of said elements being connected to rotate with said driving shaft, a second of said elements being connected to rotate with said driven shaft, a fluid pump and motor, both said pump and motor being of the type which, when inoperative, will provide barriers to a flow of liquid and each including a plurality of cylinders, valve mechanisms forming a part of said pump and motor, said valve mechanisms each presenting a plurality of pairs of ports different in number from the number of cylinders forming parts of said pump and motor, the outlet port of one pair being disposed adjacent the inlet port of the next succeeding pair each of said pairs of ports including an intake port and an exhaust port, said valve mechanisms being movable with respect to the cylinders of said pump and motor, means for effecting such relative movement and providing for a vernier action of said valve mechanisms with respect to said cylinders, means providing fluid passages extending between the exhaust ports of the pump valve mechanism and the intake ports of the motor valve mechanism as well as between the exhaust ports of the latter mechanism and the intake ports of the pump valve mechanism, said passages providing paths through which fluid may freely flow without reduction of pressure, pistons reciprocable within said pump and motor cylinders, means for connecting the pistons within said motor cylinders to said driven shaft, a third element forming a part of said gearing and driven by and intermeshing with the first named elements which form a part of said gearing, said third element being connected to the pistons within said pump cylinders for effecting reciprocation of said latter pistons, the movements of the ports of the valve mechanisms with respect to the cylinders being so timed that a piston within a pump cylinder will be performing a discharge stroke while the outlet port of the pump valve mechanism affords communication through the passage to an inlet port of the motor valve mechanism and to a cylinder of the latter while the piston therein is performing a working stroke, means for varying the length of travel of the pump pistons, and means responsive to the pressures developed within said passages for controlling said last named means.

7. A transmission including, in combination, driving and driven shafts, a gearing comprising a plurality of inter-meshing and relatively rotatable elements, one of said elements being connected to rotate with said driving shaft, a second of said elements being connected to rotate with said driven shaft, a fluid pump and motor, both said pump and motor being of the type which, when inoperative, will provide barriers to a flow of liquid and each including a plurality of cylinders, valve mechanisms forming a part of said pump and motor, said valve mechanisms each presenting a plurality of pairs of ports different in number from the number of cylinders forming parts of said pump and motor, the outlet port of one pair being disposed adjacent the inlet port of the next succeeding pair each of said pairs of ports including an intake port and an exhaust port, said valve mechanisms being movable with respect to the cylinders of said pump and motor, means for effecting such relative movement and providing for a vernier action of said valve mechanisms with respect to said cylinders, means providing fluid passages extending between the exhaust ports of the pump valve mechanism and the intake ports of the motor valve mechanism as well as between the exhaust ports of the latter mechanism and the intake ports of the pump valve mechanism, said passages providing paths through which fluid may freely flow without reduction of pressure, pistons reciprocable within said pump and motor cylinders, means for connecting the pistons within said motor cylinders to said driven shaft, a third element forming a part of said gearing and driven by and intermeshing with the first named elements which form a part of said gearing, said third element being connected to the pistons within said pump cylinders for effecting reciprocation of said latter pistons, the movements of the ports of the valve mechanisms with respect to the cylinders being so timed that a piston within a pump cylinder will be performing a discharge stroke while the outlet port of the pump valve mechanism affords communication through the passage to an inlet port of the motor valve mechanism and to a cylinder of the latter while the piston therein is performing a working stroke, means for varying the length of travel of the motor pistons and means responsive to the pressures developed within said passages for controlling said last named means.

8. A transmission including, in combination, driving and driven shafts, a gearing comprising a plurality of inter-meshing and relatively rotatable elements, one of said elements being connected to rotate with said driving shaft, a second of said elements being connected to rotate with said driven shaft, a fluid pump and motor, both said pump and motor being of the type which, when inoperative, will provide barriers to a flow of liquid and each including a plurality of cylinders, valve mechanisms forming a part of said pump and motor, said valve mechanisms each presenting a plurality of pairs of ports different in number from the number of cylinders forming parts of said pump and motor, the outlet port of one pair being disposed adjacent the inlet port of the next succeeding pair, each of said pairs of ports including an intake port and an exhaust port, said valve mechanisms being movable with respect to the cylinders of said pump and motor, means for effecting such relative movement and providing for a vernier action of said valve mechanisms with respect to said cylinders, means providing fluid passages extending between the exhaust ports of the pump valve mechanism and the intake ports of the motor valve mechanism as well as between the exhaust ports of the latter mechanism and the intake ports of the pump valve mechanism, said passages providing paths through which fluid may freely flow without reduction of pressure, pistons reciprocable within said pump and motor cylinders, means for connecting the pistons within said motor cylinders to said driven shaft, a third element forming a part of said gearing and driven by and intermeshing with the first named elements which form a part of said gearing, said third element being connected to the pistons within said pump cylinders for effecting reciprocation of said pump pistons, the movements of the ports of the valve mechanisms with respect to the cylinders being so timed that a piston within a pump cylinder will be performing a discharge stroke while the outlet port of the pump valve mechanism affords communication through the passage to an inlet port of the motor valve mechanism and to a cylinder of the latter while the piston therein is performing a working stroke, means for varying the distance travelled by the pistons within both said pump and motor cylinders, and means functioning in response to the pressures developed in the passage between said pump and motor for controlling said last named means.

9. A transmission including, in combination, a driving and a driven shaft, a planetary gear assembly including relatively movable sun, ring, and inter-meshing planet gears, one of said gears being coupled to said driving shaft, another of said gears being coupled to said driven shaft, a pump unit, a motor unit, means for adjusting at least one of said units to vary the volume of fluid displaced thereby and to interrupt the flow of fluid therethrough, said motor being coupled to said driven shaft, means providing passages extending between said pump and motor to provide paths through which fluid may flow, free from reductions in pressure, from the exhaust side of said pump to the intake side of said motor, the third gear of said planetary gear being connected to said pump to operate the latter, and means responsive to the pressures developed in said passages for automatically controlling the fluid-varying and flow-interrupting means of said one unit and to accordingly vary the ratio of, and interrupt the power transmitted hydraulically from said driving to said driven shafts.

10. A transmission including driving and driven shafts, a plurality of inter-meshing gearing elements relatively movable with respect to each other, one of said elements being operatively coupled to said driving shaft, another to said driven shaft, pump and motor units each including a plurality of cylinders, pistons reciprocable within said cylinders, a wobble-plate for effecting relative movements of said pistons and cylinders, valve mechanisms forming parts of each of said units and including a member formed with a plurality of pairs of ports the outlet port of one pair being disposed adjacent the inlet port of the next succeeding pair, said pairs of ports differing by one from the number of cylinders provided, means furnishing unobstructed fluid passageways between the valve mechanism of one unit and the valve mechanism of the other of the same, whereby to connect the exhaust ports of the valve mechanism associated with the pump with the inlet ports of the valve mechanism associated with the motor and to moreover connect the outlet ports of the latter mechanism with the inlet ports of the first named valve mechanism, said motor unit being operatively coupled to said driven shaft, means forming a part of each of said units and causing a vernier action of said valve mechanism with respect to said cylinders, the timing of the pistons and valve mechanisms being such that as a piston of said pump moves through a discharge stroke, an outlet port of the pump valve mechanism will communicate with the cylinder within which said piston is moving, and an inlet port of the valve mechanism associated with the motor will afford communication with one of the cylinders of the same and within which a piston is performing a working stroke, and a third gearing element intermeshing with and driven by said first named gearing elements, said third element being operatively coupled to said pump unit to drive the same.

11. A transmission including driving and driven shafts, a plurality of inter-meshing gearing elements relatively movable with respect to each other, one of said elements being operatively coupled to said driving shaft, another to said driven shaft, pump and motor units each including a plurality of cylinders, pistons reciprocable within said cylinders, a wobble-plate for effecting relative movements of said pistons and cylinders, valve mechanisms forming parts of each of said units and including a member formed with a plurality of pairs of ports the outlet port of one pair being disposed adjacent the inlet port of the next succeeding pair, said pairs of ports differing by one from the number of cylinders provided, means furnishing unobstructed fluid passageways between the valve mechanism of one unit and the valve mechanism of the other of the same, whereby to connect the exhaust ports of the valve mechanism associated with the pump with the inlet ports of the valve mechanism associated with the motor and to moreover connect the outlet ports of the latter mechanism with the inlet ports of the first named valve mechanism said motor unit being operatively coupled to said driven shaft, means forming a part of each of said units and causing a vernier action of said valve mechanism with respect to said cylinders, the timing of the pistons and valve mechanisms being such that as a piston of said pump moves through a discharge stroke, an outlet port of the pump valve mechanism will communicate with the cylinder within which said piston is moving, and an inlet port of the valve mechanism associated with the motor will afford communication with one of the cylinders of the same and within which a piston is performing a working stroke, a third gearing element intermeshing with and driven by said first named gearing elements, said third element being operatively coupled to said pump unit to drive the same, and means whereby the angularity of at least one of said wobble-plates may be varied to accordingly vary the distance travelled by the pistons associated with said wobble-plate to thereby accordingly vary the amount of fluid displaced by said pistons or to prevent the flow of any fluid through the unit with which said variable wobble plate is associated.

12. A transmission including driving and driven shafts, a plurality of inter-meshing gearing elements relatively movable with respect to each other, one of said elements being operatively coupled to said driving shaft, another to said driven shaft, pump and motor units each including a plurality of cylinders, pistons reciprocable within said cylinders, a wobble-plate for effecting relative movements of said pistons and cylinders, valve mechanisms forming parts of each of said units and including a member formed with a plurality of pairs of ports the outlet port of one pair being disposed adjacent the inlet port of the next succeeding pair, said pairs of ports differing by one from the number of cylinders provided, means furnishing unobstructed fluid passageways between the valve mechanism of one unit and the valve mechanism of the other of the same, whereby to connect the exhaust ports of the valve mechanism associated with the pump with the inlet ports of the valve mechanism associated with the motor and to moreover connect the outlet ports of the latter mechanism with the inlet ports of the first named valve mechanism said motor unit being operatively coupled to said driven shaft, means forming a part of each of said units and causing a vernier action of said valve mechanism with respect to said cylinders, the timing of the pistons and valve mechanisms being such that as a piston of said pump moves through a discharge stroke, an outlet port of the pump valve mechanism will communicate with the cylinder within which said piston is moving, and an inlet port of the valve mechanism associated with the motor will afford communication with one of the cylinders of the same and within which a piston is performing a working stroke, a third gearing element intermeshing with and driven by said first named gearing elements, said third element being operatively coupled to said pump unit to drive the same, and means for shifting the angularity of at least one of said wobble-plates whereby said motor will function as a pump; the first named pump thus functioning as a motor to drive the third element of said gearing to thus transmit force to said driven shaft said plates being moreover adjustable to prevent a flow of fluid through the units with which they are associated, whereby to cause all power to be transmitted through said gearing elements from said driving to said driven shaft.

13. A transmission including driving and driven shafts, a plurality of inter-meshing gearing elements relatively movable with respect to each other, one of said elements being operatively coupled to said driving shaft, another to said driven shaft, pump and motor units each including a plurality of cylinders, pistons reciprocable within said cylinders, a wobble-plate for effecting relative movements of said pistons and cylinders, valve mechanisms forming parts of each of said units and including a member formed with a plurality of pairs of ports the outlet port of one pair being disposed adjacent the inlet port of the next succeeding pair, said pairs of ports differing by one from the number of cylinders provided, means furnishing unobstructed fluid passageways between the valve mechanism of one unit and the valve mechanism of the other of the same, whereby to connect the exhaust ports of the valve mechanism associated with the pump with the inlet ports of the valve mechanism associated with the motor and to moreover connect the outlet ports of the latter mechanism with the inlet ports of the first named valve mechanism said motor unit being operatively coupled to said driven shaft, means forming a part of each of said units and causing a vernier action of said valve mechanism with respect to said cylinders, the timing of the pistons and valve mechanisms being such that as a piston of said pump moves through a discharge stroke, an outlet port of the pump valve mechanism will communicate with the cylinder within which said piston is moving, and an inlet port of the valve mechanism associated with the motor will afford communication with one of the cylinders of the same and within which a piston is performing a working stroke, a third gearing element intermeshing with and driven by said first named gearing elements, said third element being operatively coupled to said pump unit to drive the same, and means for varying the angularity of the wobble-plate of at least one of said units to cause substantially no travel of the pistons of said unit within the cylinders thereof, whereby the circulation of fluid through said passages will be substantially interrupted, and the third element of said gearing will act as a reaction point to cause substantially all force to be transmitted mechanically from said driving to said driven shaft and by said first named gearing elements.

14. A transmission including driving and driven shafts, a plurality of inter-meshing gearing elements relatively movable with respect to each other, one of said elements being operatively coupled to said driving shaft, another to said driven shaft, pump and motor units each including a plurality of cylinders, pistons reciprocable within said cylinders, a wobble-plate for effecting relative movements of said pistons and cylinders, valve mechanisms forming parts of each of said units and including a member formed with a plurality of pairs of ports, said pairs of ports differing by one from the number of cylinders provided, means furnishing fluid passageways between the valve mechanism of one unit and the valve mechanism of the other of the same, whereby to connect the exhaust ports of the valve mechanism associated with the pump with the inlet ports of the valve mechanism associated with the motor and to moreover connect the outlet ports of the latter mechanism with the inlet ports of the first named valve mechanism said motor unit being operatively coupled to said driven shaft, means forming a part of each of said units and causing a vernier action of said valve mechanism with respect to said cylinders, the timing of the pistons and valve mechanisms being such that as a piston of said pump moves through a discharge stroke, an outlet port of the pump valve mechanism will communicate with the cylinder within which said piston is moving, and an inlet port of the valve mechanism associated with the motor will afford communication with one of the cylinders of the same and within which a piston is performing a working stroke, a third gearing element intermeshing with and driven by said first named gearing elements, said third element being operatively coupled to said pump unit to drive the same, means whereby the angularity of at least one of said wobble-plates may be varied to accordingly vary the distance travelled by the pistons associated with said wobble-plate to correspondingly vary the volume of fluid displaced by said pistons and to interrupt the flow of fluid through the unit in which the angularity of the wobble-plate is varied, and means for effecting such variation in angularity of the wobble-plate responsive to the pressures developed in such passageway.

15. A transmission including, in combination, a driving and a driven shaft, a gearing assembly comprising three intermeshing gears, one of said gears being coupled to said driving shaft, another of said gears being coupled to said driven shaft, a pump unit, a motor unit, means for adjusting at least one of said units to vary the volume of fluid displaced thereby and whereby said latter unit will function as a metering device to control the volume of fluid delivered by the other unit, said motor being coupled to said driven shaft, means providing passages extending between said pump and motor to provide paths through which fluid may flow, free from reductions in pressure, from the exhaust side of said pump to the intake side of said motor, the third of said gears being connected to said pump to operate the latter, and means connected and responsive to the pressures developed in said passages to shift said unit adjusting means and automatically control the volume of fluid through the unit with which it is associated and to accordingly vary the ratio of power transmitted hydraulically from said driving to said driven shafts.

ELIAS ORSHANSKY, Jr.